Feb. 11, 1941.    R. R. LONGWELL    2,231,727
CONTROL SYSTEM
Filed April 29, 1939
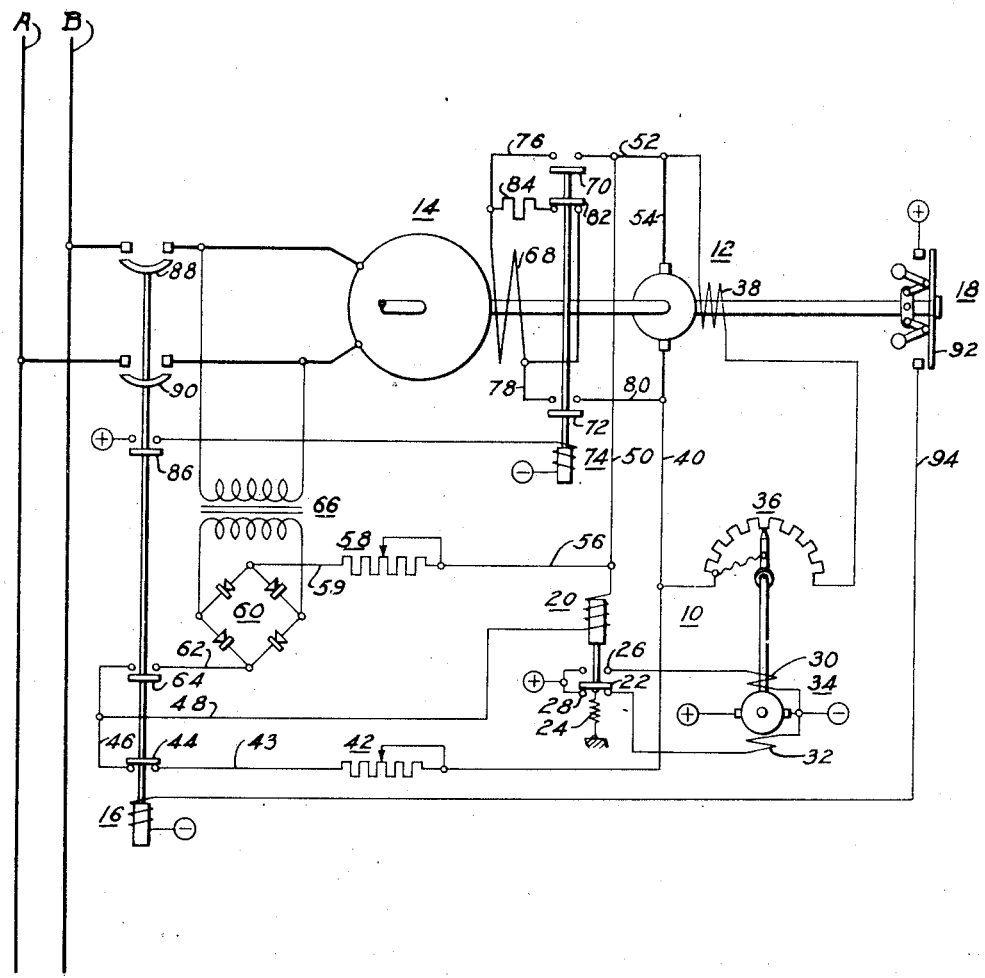
WITNESSES:
N. F. Susser
Joe Weber
INVENTOR
Robert R. Longwell.
BY
Crawford
ATTORNEY Patented Feb. 11, 1941

2,231,727

UNITED STATES PATENT OFFICE 2,231,727

CONTROL SYSTEM

Robert R. Longwell, Wilkinsburg, Pa., assignor to Westinghouse Electric & Manufacturing Company, East Pittsburgh, Pa., a corporation of Pennsylvania Application April 29, 1939, Serial No. 270,842

2 Claims. (Cl. 171—119)

My invention relates, generally, to control systems, and, more particularly, to a system for controlling the excitation of a generator.

It is common practice in starting a generator and placing it on a line to which other generators and a load are connected to bring the generator up to speed and apply the proper excitation to the generator after it is connected to the line. In such systems, since the generator field winding is not energized until the generator is connected to the line, the voltage regulator which controls the generator voltage while the generator is in normal operation cannot control the generator voltage until the generator is connected to the line. If the excitation applied to the generator after it is connected to the line is materially greater than that required to produce a voltage equal to that of the line, there will be an undesirable surge of current until the generator voltage regulator can adjust the generator voltage to the proper value. It is, therefore, desirable that the voltage of the exciter be such, when it is connected to energize the generator field after the generator is connected to the line, as to produce a generator excitation which will result in the desired generator voltage.

An object of my invention, therefore, is to provide a control system for the exciter of a generator which shall function to so regulate the output potential of the exciter as to provide a predetermined generator potential when the exciter is connected to energize the field winding of the generator.

Another object of the invention is to provide a control system which shall function to utilize a regulator to control the output potential of an exciter for a generator, in response to the output potential of the exciter until the exciter is connected to energize the generator field winding, and thereafter to control the output potential of the exciter in reseponse to the output potential of the generator.

These and other objects and advantages of the invention will be apparent from the following detailed description taken in connection with the accompanying drawing in which the single figure is a diagrammatic view of a generator and control system therefor embodying the principal features of my invention.

The invention is particularly applicable to alternating-current generators having self-synchronizing characteristics to permit them to pull into step when they are connected to a line at slightly less than synchronous speed.

In practicing my invention, I provide a regulator 10 which controls the excitation of an exciter 12. The exciter 12 provides the excitation for the generator 14 which is connected to the load bus A—B by a circuit breaker 16 under the control of a speed responsive switch 18. The exciter 12 is not connected to excite the generator 14 while the generator is being brought up to speed, the output potential of the exciter during this acceleration period being regulated by the regulator 10 in response to the exciter potential. When the generator 14 attains a predetermined speed, the speed responsive switch 18 functions to energize the circuit breaker 16 to connect the generator 14 to the load bus, to connect the exciter 12 to energize the field of the generator 14, and to connect the regulator 10 to be controlled by the output potential of the generator 14.

The regulator 10 comprises a solenoid 20 which actuates a contact element 22 against the bias of a spring element 24. Front contact elements 26 and back contact elements 28 are disposed to cooperate with the contact element 22 to control the energization of the field windings 30 and 32, respectively, of the double field reversible motor 34. The motor 34 drives a rheostat 36 which is connected in circuit with the field winding 38 of the exciter 12 to control the excitation of the exciter 12 and, therefore, its output potential.

The winding of the solenoid 20 is connected in a circuit to be energized in accordance with the output potential of the exciter 12 which extends from one side of the exciter 12 through a conductor 40, a calibrating rheostat 42, a conductor 43, a back contact element 44 of the circuit breaker 16, conductors 46 and 48, the winding of the solenoid 20, and conductors 50, 52 and 54 to the other side of the exciter 12. Another circuit is provided for the solenoid 20 whereby the solenoid may be energized in accordance with the output potential of the generator 14. This circuit extends from one side of the winding of the solenoid 20 through the conductors 50 and 56, a calibrating rheostat 58, a conductor 59, a rectifier 60, a conductor 62, a front contact element 64 of the circuit breaker 16, and conductors 46 and 48 to the other side of the winding of the solenoid 20. The potential applied to this circuit is applied to the rectifier 60 through a transformer 66 whose primary winding is connected to be energized by the output potential of the generator 14, and whose secondary winding is connected across the rectifier 60.

The field winding 68 of the generator 14 may be connected to be energized by the exciter 12 by means of the contact elements 70 and 72 of a relay 74 through a circuit which extends from one side of the exciter 12 through the conductors 54 and 62, the contact element 70, conductor 76, the field winding 68, conductor 78, the contact element 72, and conductors 80 and 40 to the other side of the exciter 12. A back contact element 82 of the relay 74 is disposed to connect a discharge resistor 84 across the field winding 68 when the field winding is disconnected from the exciter 12. The winding of the relay 74 is connected to be energized under the control of a front contact 86 of the circuit breaker 16 in a circuit as indicated in the drawing.

The main contact elements 88 and 90 of the circuit breaker 16 are disposed to connect the generator 14 to a power bus indicated by the conductors A—B upon closure of the circuit breaker 16. It is to be understood that the power bus A—B is a bus to which alternating-current power, other than that provided by the generator 14, is applied, so that the generator 14 which, as is hereinbefore pointed out, is an alternating-current generator having self-synchronizing characteristics to permit it to pull into step as a motor, will be automatically synchronized when connected to the bus A—B at slightly less than synchronous speed.

The operation of the circuit breaker 16 is controlled by a speed responsive switch 18 driven by the generator 14, as indicated, through a circuit which extends from one side of a suitable source of direct-current power through the contact element 92 of the switch 18, conductor 84, and the operating winding of the circuit breaker 16 to the other side of the source of power.

In the operation of the system, the generator 14 will be driven by any suitable prime mover (not shown in the drawing), and as it is accelerated, its field winding 68 will not be energized, but the output potential of its exciter 12 will be controlled by the regulator 10 and will be maintained at such a value as will provide the desired excitation of the generator 14 after the generator is connected to the bus A—B. When the generator 14 has reached a speed slightly less than synchronous speed, the contact element 92 of the speed responsive switch 18 will be moved to closed circuit position to energize the operating winding of the circuit breaker 16. The closure of the circuit breaker 16 will cause the generator 14 to be connected to the bus A—B from which power will flow to the generator to pull it into step. Simultaneously with the connection of the generator 14 to the bus A—B, the relay 74 will be energized to cause the field winding 68 to be connected to the exciter 12. At the same time the control of the regulator 10 will be transferred from the exciter potential to the generator potential by the movement of the back contact element 44 of the circuit breaker 16 to open circuit position, and the front contact 64 of the circuit breaker 16 to closed circuit position. The generator 14 will thus have applied to it an excitation of the correct value to produce a generator terminal voltage approximately equal to that of the line to which it is connected.

Due to the fact that the output potentials of the generator 14 and the exciter 12 may differ, the calibrating rheostats 58 and 42 may be independently adjusted to provide the necessary potential for the regulator 10 regardless of whether it be connected to be controlled by the exciter potential or the generator potential.

While the operation of the system has been described in connection with the control of the excitation of an alternating-current generator having self-synchronizing characteristics, it is to be understood that the system may also be used to control the excitation of a direct-current generator, in which event the rectifier 60 and the transformer 66 would not be used, but the conductors 59 and 62 would be connected directly to the leads of the generator 14.

It will be seen that I have provided a control system for a generator which shall function to so regulate the output potential of the generator exciter as to provide a predetermined generator potential when the exciter is connected to energize the field winding of the generator, which shall function to utilize a regulator to control the output potential of a generator exciter while the generator is accelerating and utilize the same regulator to control the output potential of the exciter in response to the output potential of the generator after the generator has accelerated to a predetermined speed; and is connected to a power bus which shall function to connect the generator to a power bus at the predetermined speed, and which shall function to connect the exciter to energize the field winding of the generator after the generator has been connected to the power bus.

In compliance with the requirements of the patent statutes, I have shown and described herein the preferred embodiment of my invention. It is to be understood, however, that the invention is not limited to the precise construction shown and described, but is capable of modification by one skilled in the art, the embodiment herein shown being merely illustrative of the principles of my invention.

I claim as my invention:

1. In a system for controlling the excitation of a generator as it is brought up to speed and connected to a power bus, an exciter for the generator, means for causing said exciter to generate an excitation potential which, when applied to the field winding of the generator, will cause the generator to generate a potential substantially equal to the line potential comprising a direct-current potential responsive regulator for said exciter, a first circuit connecting said regulator to be controlled by the potential of the exciter, calibrating means in said first circuit for causing said regulator to so control said exciter in response to the exciter potential as to produce the above recited excitation potential, a second circuit connecting said regulator to be controlled by the potential of the generator, calibrating means in said second circuit for causing said regulator to so control said exciter in response to the generator potential as to produce the above recited excitation potential, control means for connecting said exciter in energizing relation with the field winding of the generator, and means controlled by the generator speed for simultaneously opening said first circuit, closing said second circuit, energizing said control means and connecting the generator to a power bus.

2. The combination with a generator having an exciter for energizing its field winding, of a main switch operable to connect the generator to a load circuit, auxiliary switch means controlled by the main switch for connecting the exciter to the field winding of the generator on closure of the main switch, a regulator operable to control the voltage of the exciter, said regulator having an electro-responsive element, first circuit means controlled by the main switch when in its open position for connecting the electro-responsive means of the regulator to the exciter, second circuit means controlled by the main switch when in its closed position for connecting the said electro-responsive means of the regulator to the generator, an adjustable calibrating resistor connected in the first circuit means whereby the regulator may be caused to maintain the voltage of the exciter at such value as required by the generator to cause its voltage to be substantially equal to the voltage of the load circuit, and control switch means responsive to the speed of the generator for effecting closure of the main switch to connect the generator to the load circuit when it reaches a predetermined speed, transfer the regulator connection to the generator and connect the exciter to the field winding of the generator.

ROBERT R. LONGWELL.